US010311382B2

(12) United States Patent
Lee

(10) Patent No.: US 10,311,382 B2
(45) Date of Patent: Jun. 4, 2019

(54) ONLINE OBJECT RESERVATION SYSTEM AND ONLINE OBJECT RESERVATION METHOD

(71) Applicant: KKBOX Technologies Limited, Hong Kong (HK)

(72) Inventor: Ming-Che Lee, Taipei (TW)

(73) Assignee: KKBOX Technologies Limited, Kowloon (HK)

( * ) Notice: Subject to any disclaimer, the term of this patent is extended or adjusted under 35 U.S.C. 154(b) by 980 days.

(21) Appl. No.: 14/811,819

(22) Filed: Jul. 28, 2015

(65) Prior Publication Data
US 2016/0063400 A1    Mar. 3, 2016

(30) Foreign Application Priority Data
Aug. 29, 2014  (TW) .............................. 103129964 A

(51) Int. Cl.
*G06Q 10/02* (2012.01)

(52) U.S. Cl.
CPC ................................... *G06Q 10/02* (2013.01)

(58) Field of Classification Search
CPC ........ G06Q 10/02; G06Q 50/30; G06Q 50/14; G06Q 10/025; G06Q 10/06315; G06Q 10/087; G06Q 10/1095; G06Q 30/0633; G06Q 10/04; G06Q 10/06311; G06Q 20/409; G06Q 30/0643; G06Q 30/08; G06Q 50/01; G06Q 20/202; G06Q 30/0222;
(Continued)

(56) References Cited

U.S. PATENT DOCUMENTS 6,161,147 A  * 12/2000 Snyder ................... G06F 9/465
                                                     719/310
7,496,527 B2 *  2/2009 Silverstein ............. G06Q 20/04
                                                     705/26.8
(Continued)

FOREIGN PATENT DOCUMENTS

CN        1799243 B     12/2010
CN      102004941 A      4/2011
(Continued)

OTHER PUBLICATIONS

Ding, Ding; Ou, Jihong; Ang, James, "Analysis of ticket queues with reneging customers," The journal of the Operational Research Society, vol. 66, Issue. 2, pp. 231-246. (Year: 2015).*

*Primary Examiner* — Kevin H Flynn
*Assistant Examiner* — Brian Adams Heflin
(74) *Attorney, Agent, or Firm* — CKC & Partners Co., LLC

(57) ABSTRACT

An online object reservation system includes a database and an object reservation server. The database stores multiple objects associated with individual selection status. The object reservation server establishes a continuous connection with a client to provide a reservation page and receive reservation requirements from the client. The object reservation server automatically selects connection objects according to the reservation requirements. The object reservation server also establishes other connections with other clients. Whenever the selection status of any of the objects is altered, the object reservation server sends a refresh notification to the client to update contents rendered on the reservation page.

12 Claims, 5 Drawing Sheets

(58) Field of Classification Search
CPC .......... G06Q 20/3224; G06Q 30/016; G06Q 10/1093; G07F 17/1236; G07F 17/1292; G07F 17/32; G07F 17/35; H04N 21/4781; H04N 21/47815; H04L 9/3213; G06F 3/0482

See application file for complete search history.

(56) References Cited

U.S. PATENT DOCUMENTS

| | | |
|---|---|---|
| 7,548,866 B2 | 6/2009 | Halavais et al. |
| 2002/0082879 A1 | 6/2002 | Miller et al. |
| 2008/0281644 A1 | 11/2008 | Payne |
| 2009/0030748 A1 † | 1/2009 | Halavais |
| 2012/0078667 A1 † | 3/2012 | Denker |
| 2012/0101859 A1 | 4/2012 | Boulton et al. |
| 2012/0203579 A1 | 8/2012 | Glasson et al. |
| 2013/0018713 A1 † | 1/2013 | Kumar |
| 2013/0046813 A1 † | 2/2013 | Yuan |
| 2013/0268899 A1 * | 10/2013 | Valentino ............ G06Q 10/02 715/852 |

FOREIGN PATENT DOCUMENTS

| | | |
|---|---|---|
| CN | 102142122 A | 8/2011 |
| TW | 201227565 A | 7/2012 |

\* cited by examiner
† cited by third party

ONLINE OBJECT RESERVATION SYSTEM AND ONLINE OBJECT RESERVATION METHOD

RELATED APPLICATIONS

This application claims priority to Taiwan Application Ser. No. 103129964 filed Aug. 29, 2014, which is herein incorporated by reference.

BACKGROUND

Field of Invention

The present disclosure relates to an online object reservation system and an online object reservation method. More particularly, the present disclosure relates to the online object reservation system and the method providing real-time information of a reservation status.

Description of Related Art

Conventionally, when reserving limited objects such as tickets of a performance, hotel rooms, or appointments to see a doctor, it needs people to manage reservation data to avoid a duplication of a reservation. However, the labor resource does not meet the requirement as a scale of business is getting larger. The technology of database drives an electronization of an object reservation system, improves the efficiency of the labor management, and decreases a probability of causing an error.

The daily widespread of the Internet changes the business model again. An online reservation system can continuously take reservations on 24 hours a day. It saves the labor cost for a reservation process and becomes the first choice of the industry to promote the business.

However, when using the online reservation system, it usually has a situation that multiple available objects are shown when a connection is succeed, but a user knows that a selected object has been reserved by someone else after he delivers a confirmation. It causes that the user has to start over the reservation process, and it is not convenient. In addition, such short time gap can usually let all the objects be reserved for popular performances and popular places to stay. It causes an unfair situation that the user logging in the online reservation system first cannot successfully reserve the objects.

SUMMARY

To deal with inconvenience that a conventional online object reservation system brings to a user, a novel online object reservation system is required to improve the reservation process. One aspect of the invention provides an online object reservation system including a database and an object reservation server. The database stores multiple objects, and each of the objects is corresponding to a selection status. The object reservation server is connected to the database and establishes a continuous connection with a client device for providing a reservation page to the client device and receiving a reservation requirement from the client device, and automatically selects at least one of the objects as a connection selection object according to the reservation requirement. The object reservation server renders the objects through the reservation page, wherein the reservation page distinguishes the selection status corresponding to the connection selection object from the selection statuses corresponding to the objects by a visual feature. The object reservation server also establishes an additional continuous connection with an additional client device, and when the selection status corresponding to any one of the objects altered by the additional client device, the object reservation server sends a refresh notification to the client device through the continuous connection for updating contents rendered on the reservation page.

In an embodiment, the object reservation server receives an addition request from the client device for adding an added object into the connection selection object, wherein the added object is one of the objects. When the selection status corresponding to the added object is selectable, the object reservation server sets the selection status corresponding to the added object as unselectable, and adds the added object into the connection selection object, and updates the contents rendered on the reservation page.

In an embodiment, the object reservation server receives a displace request from the client device, wherein the displace request indicates a selection object, and the selection object is one of the objects. When the selection status corresponding to the selection abject is selectable, the object reservation server sets the selection status corresponding to the selection object as unselectable, sets the selection status corresponding to the connection selection object as selectable, updates the connection selection object, and updates the contents rendered on the reservation page.

In an embodiment, the object reservation server includes a timer. The object reservation server activates the timer when the continuous connection is established. When an accumulated time value of the timer is greater than a predetermined value, the object reservation server disconnects the continuous connection, and sets the selection status corresponding to the connection selection object as selectable.

In an embodiment, the objects in the database are seats, and the reservation requirement includes a ticket price and a field area.

In an embodiment, the object reservation server renders, through the reservation page, updating statistics of the selection status corresponding to the objects after the continuous connection is established.

In an embodiment, the object reservation server renders a status of the additional continuous connection through the reservation page.

Another aspect of the disclosure provides an object reservation system includes following steps. A continuous connection is established to communicate with a client device, and a reservation page is provided to the client device. A reservation requirement transmitted from the client device is received. One of objects in a database is automatically selected as a connection selection object according to the reservation requirement, in which each of the objects is corresponding to a selection status. The selection status corresponding to the connection selection object is set as unselectable. The objects are rendered through the reservation page, and the selection status corresponding to the connection selection object is distinguished from the selection statuses corresponding to the objects by a visual feature. An additional continuous connections is established to communicate with an additional client device. When the selection status corresponding to any one of the objects is altered by the additional client device, an object reservation server transmits a refresh notification, and updates contents rendered on the reservation page.

The online object reservation system and method in the disclosure have following advantages. After a user successfully logs in and obtains the connection selection object, a reservation for the connection selection object of the user from the additional connections is restricted to prevent the object to be reserved from being reserved by someone else when the user delivers a confirmation. It smoothens over the reservation process and reduces the inconvenience that the user has to start over the selection after the reservation is failed. In addition, it also provides the user with real-time information of the selection status so that the user is aware of a popularity of the object to be reserved, and it can help the user make the reservation decision. Last, providing the user with the real-time information also has advantages for the object provider because the user intends to quickly make the reservation decision when the user observes that the object is popular. As a result, a reservation rate may be increased.

BRIEF DESCRIPTION OF THE DRAWINGS

The disclosure can be more fully understood by reading the following detailed description of the embodiment, with reference made to the accompanying drawings as follows.

DETAILED DESCRIPTION

Embodiments are further described in detail below with reference to the accompanying drawings, however, the embodiments described are not intended to limit the present disclosure and it is not intended for the description of operation and structure to limit the order of implementation. Moreover, any device with equivalent functions that is produced from a structure formed by a recombination of elements shall fall within the scope of the present disclosure. Additionally, for the convenience of understanding, identical units use identical symbols or numbers in the description.

In the embodiments and the claims, the using of singular form of "a", "an" and "the" intends to cover singular and plural forms except that it is clearly indicated in the specification.

One aspect of the present disclosure is an online object reservation system allowing users to reserve demanded objects from the system. The objects includes seats such as seats of a performance, seats of a flight, or seats in a restaurant, and time sections such as time sections to see a doctor, or time sections for a tutor. The disclosed online object reservation system allows several users to log in and use at the same time, and temporarily keeps the objects that the users are considering to reserve during the connection, and let all the user receive real-time information of a reservation status. It avoids a situation that the users think they have succeed the reservation after they are connected to the system, but they find the objects to be reserved have been reserved by other users when they are confirming the reservation. It will be described with reference of the figures how the users operate a client device to connect to the online object reservation and reserve a selection object.

Figure 1:
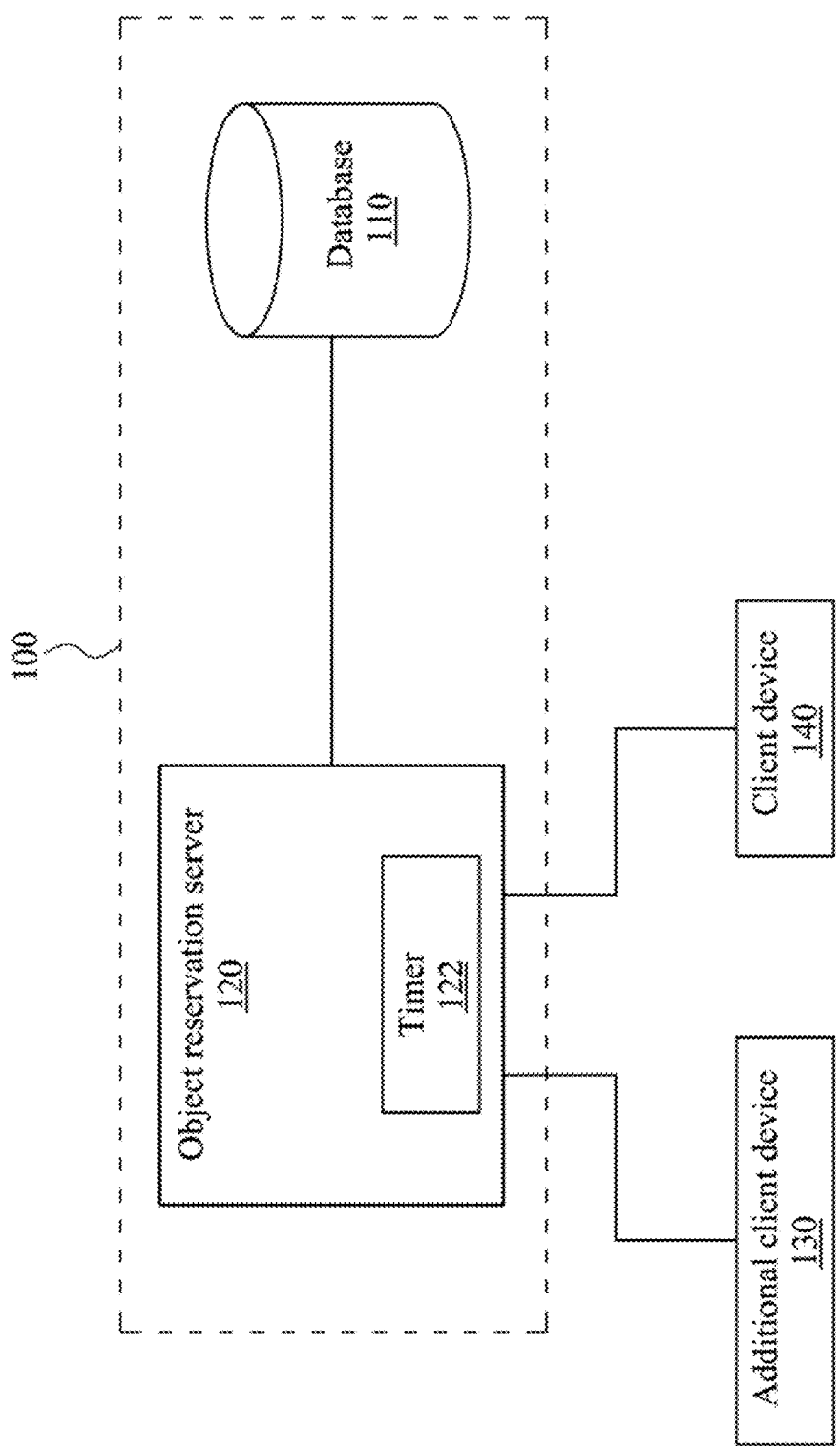
FIG. 1 is a schematic diagram illustrating an online object reservation system according to a first embodiment.

FIG. 1 is a schematic diagram illustrating an online object reservation system according to a first embodiment. A user operates a client device to connect to an online object reservation system 100 to reserve selected objects. In the embodiment, a client device 140 and an additional client device 130 are connected to the online object reservation system 100 through the Internet. The number of the client devices connected to the online object reservation system 100 can be plural which is not limited to the embodiment.

The online object reservation system 100 includes a database 110 and an object reservation server 120. The object reservation server 120 is connected to the database 110 to access the database 110, and the database 110 stores multiple objects, in which each of the objects is corresponding to a selection status.

In the embodiment, the selection status may be selectable or unselectable. "Selectable" means the object is available to be reserved, and "unselectable" means the object cannot be reserved. In another embodiment, the selection status may be "reserved and paid", "reserved", or "unreserved", and when the selection status is one of the former two, no reservation can be done; and when the selection status is "unreserved", a reservation can be taken.

The object reservation server 120 is a server at a working group level, a server at a department level or a server at an enterprise level. The database 110 is stored in a storage device which may be a hard disk or other computer readable recording medium. The database 110 may also be a database in the cloud, and the object reservation server 120 accessed the database 110 through a wire or wireless Internet connection.

The client device 140 and the object reservation server 120 establish a continuous connection (i.e. a full-duplex connection), and therefore the client device 140 and the object reservation server 120 can communicate by a bi-directional data transmission. The object reservation server 120 provides a reservation page to the client device 140 and receives a reservation requirement from the client device 140 though the continuous connection. In the embodiment, the reservation page is a webpage file. The client device 140 interpret the reservation page by a browser or a mobile application, and renders the reservation page on the client device 140 for users to browse.

The client device 140 is an electronic device having a display and capable of connecting to the Internet. In an embodiment, the client device 140 is a personal computer. In another embodiment, the client device 140 is a smart phone. In yet another embodiment, the client device 140 is a tablet.

In the embodiment, the client device 140 and the object reservation server 120 establish the continuous connection by technology of WebSocket. Therefore, a loading of transmitting information through the full-duplex connection can be reduced, and then the object reservation server 120 can push information to the client device 140. In another embodiment, the connection is established by technology of long polling of Comet. In yet another embodiment, the connection is established by technology of iframe of Comet, and therefore the continuous connection can still be used to provide a reservation service when the version of the webpage technology supported by the client device 140 is relatively old.

In the embodiment, the online object reservation system 100 is a reservation system for tickets of a performance, and therefore the objects stored in the database 110 of the online object reservation system 100 are multiple seats. The reservation requirement received from the client device 140 includes a number of the tickets, a ticket price and a field area. In another embodiment, the online object reservation system 100 is a reservation system for time sections to see a doctor, and the reservation requirement includes a particular doctor and a particular time section.

Figure 2A:
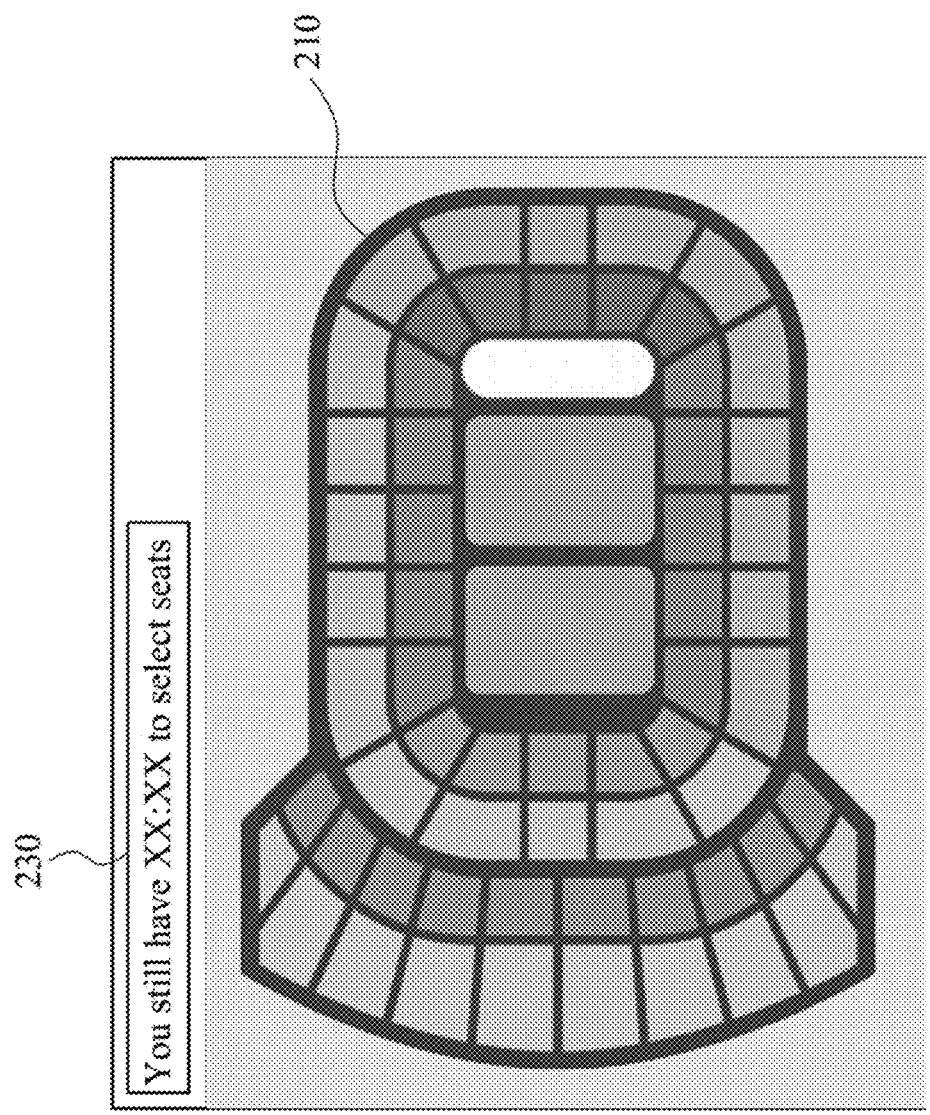
FIG. 2A is a first schematic diagram illustrating the online object reservation system according to the first embodiment.

FIG. 2A is a first schematic diagram illustrating a reservation page of the online object reservation system 100 according to the first embodiment. After the client device 140 and the object reservation server 120 establish a continuous connection, the object reservation server 120 renders a floor plan 210 of a performance field through the reservation page. A user operates the client device 140 to input, by a click way, that the field area is the reservation requirement. The object reservation server 120 automatically selects one of the seats stored in the database 110 according to the reservation requirement, and renders the objects through the reservation page. In the embodiment, the number of the tickets that the user wants to reserve is one, but the number is only an example for convenience of explanation and the present disclosure is not limited thereto.

In another embodiment, after the client device 140 and the object reservation server 120 establish the continuous connection, the user can input that the ticket price or the number of the tickets are the reservation requirement by a way of text or a pull-sown menu.

Figure 2B:
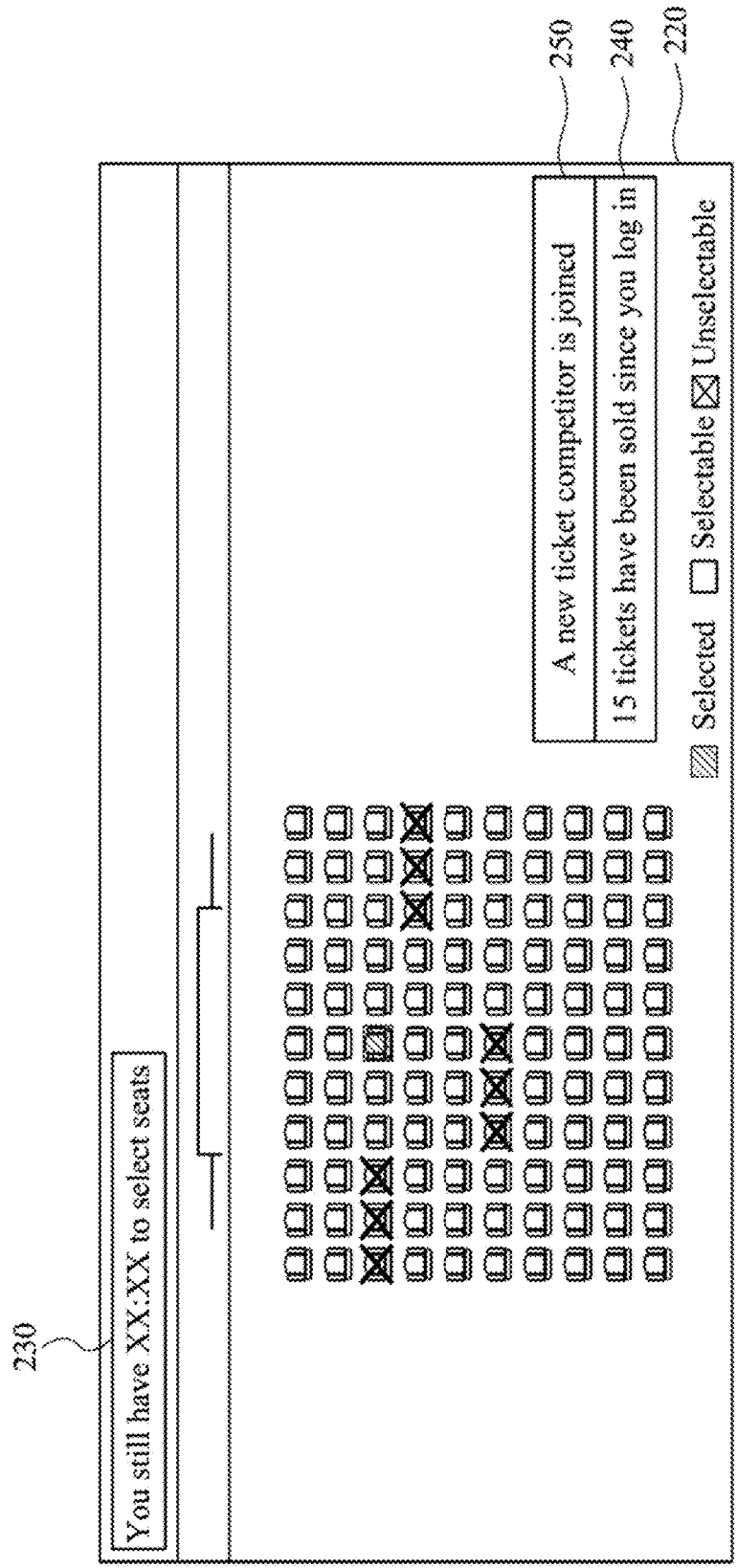
FIG. 2B is a second schematic diagram illustrating the online object reservation system according to the first embodiment.

FIG. 2B is a second schematic diagram illustrating the online object reservation system 100 according to the first embodiment. After the user selects a field area in the floor plan 210 as the reservation requirement, the object reservation server 120 automatically selects a connection selection object. The connection selection object is the object temporarily kept for the user before the continuous connection is disconnected. The object reservation server 120 renders the objects of the database 110 located in the field area through the reservation page shown in FIG. 2B. The connection selection object (i.e. the seats labeled as selected and shown with slash line in the figure) is distinguished from the objects (i.e. the seats labeled as selectable and shown with empty space in the figure) which corresponding selection status is selectable and the objects (i.e. the seats labeled as unselectable and shown with a cross in the figure) which corresponding selection status is unselectable by a visual feature 220 in the reservation page; in other words, in the embodiment, the visual feature 220 is a symbol. In another embodiment, the visual feature 220 is a color.

The object reservation server 120 also includes a timer 122. When the object reservation server 120 establishes the continuous connection with the client device 140, it activates the timer 122. When an accumulated time value of the timer 122 is greater than a predetermined value, the object reservation server 120 disconnects the continuous connection and sets the selection status corresponding to the connection selection object as selectable. Since the selection status corresponding to the connection selection object is set as unselectable before the continuous connection is disconnected, the function of the timer 122 is to restrict operation time of the user to prevent the objects from being occupied by the user who does not want to reserve or idles the reservation page.

In the embodiment, a timing notification 230 in the reservation page presents how long the timer 122 will get to the predetermined value, in which the predetermined value corresponding to the timer 122 is set as 10 minutes. In another embodiment, the predetermined value corresponding to the timer 122 is set as 5 minutes, and the objection reservation server 120 resets the timer 122 when the user performs an inputting operation on the reservation page. In yet another embodiment, the predetermined value corresponding to the timer 122 can be adjusted by a quantity of the client devices connected to the object reservation server 120. For example, the quantity of the client devices connected to the object reservation server 120 may be determined by a ratio of a connection number and the number of available tickets. If the number of the connected client device is more than 50% of all available tickets, then the predetermined value is set as 5 minutes which is relatively small to prevent the tickets from being occupied by the spare users, and it can increase a rate of successful reservation. If the number of the client devices connected to the object reservation server 120 is less than 50% of all available tickets, then the predetermined value is set as 10 minutes to keep the continuous connection between the client devices and the object reservation server 120 longer, letting the users have enough time to consider whether to reserve the tickets.

It should be understood that the timer 122 is selectively added into the online object reservation system 100 in an implementation. For example, in an embodiment, the online object reservation system is implemented as a flight ticket reservation system, and the object reservation server 120 may not include the timer 122, and the timing notification 230 is not shown in the reservation page, either. The application used to browse the reservation page in the client device 140 can keep staying on the reservation page until it is time out and disconnected automatically.

The object reservation server 120 also establishes an additional continuous connection with the additional client device 130. The additional client device 130 reserves the objects stored in the database 110 through the additional connection. That is, a user of the client device 30 and a user of the client device 140 alter the selection statuses of the objects in the database 110 in the same way. Note that the connection selection object of the client device 140 is rendered as unselectable on a reservation page of the additional client device 130. Every time the selection status of any one of the objects is altered by the additional client device 130, the object reservation server 120 sends a refresh notification to the client device 140 through the continuous connection, and updates contents rendered on the reservation page, and renders the selection statuses corresponding to the objects in the database 110 Similarly, when the user operates the client device 140 to alter the selection status corresponding to the objects in the database 110, the object reservation server 120 also sends the refresh notification to the additional client device 130 through the additional connection, and updates contents rendered on the reservation page of the additional client device 130.

In the embodiment, the object reservation server 120 establishes only one additional connection with the additional client device 130. However, after people in the art understands the embodiments, he or she can change or modify the disclosed technology to apply to a situation that the object reservation server 120 establishes connections with multiple additional client devices. As a result, all the reservation pages provided by the object reservation server 120 to the client devices show real-time situations of the reservation.

In an embodiment, in addition to update the seats and show the real-time situations of the reservation, the object reservation server 120 also renders updating statistics of the selection statuses corresponding to the objects in the database 110 after the continuous connection is established through a selling stats 240 on the reservation page. In the embodiment, the updating statistics presented by the selling status 240 is the number of the reserved and confirmed objects after the connection is established. For example, the selling status 240 in the FIG. 2B shows "15 tickets have been sold since you log in". In another embodiment, the updating statistics presented by the selling status 240 is the number of the objects which selection status have been altered into unselectable since the connection is established.

The object reservation server 120 presents the status of the additional connections through a connection status 250 on the reservation page. In the embodiment, when the additional client device 130 and the object reservation server 120 establish the additional continuous connection, the connection status 250 shows a message of "a new ticket competitor is joined". In another embodiment, the object reservation server 120 also establishes continuous connections with several additional client devices (not shown in the figure), and the connection status 250 presents the amount of the client devices connected to the object reservation server 120 such as "a total of 250 people are booking tickets right now".

The object reservation server 120 also receives an addition request from the client device 140 for adding an added object to the connection selection object. The added object is one of the objects in the database 110, and is one of the objects rendered on the reservation page. When the selection status corresponding to the added object is selectable, the object reservation server 120 sets the selection status corresponding to the added objects unselectable, and adds the added object into the connection selection object, and updates the contents rendered on the reservation page to inform the user that the operation of the addition request is succeed. If the selection status corresponding to the added object is unselectable, then the user is informed through the reservation page that the addition is failed.

In the embodiment, the user clicks and selects a seat, which selection status is selectable, on the reservation page as the added object and sends the addition request. When the object reservation server 120 confirms that the selection status corresponding to the added object is selectable, it alters the selection status as unselectable, and adds the added object into the connection selection object, and updates the contents rendered on the reservation page, and marks the added object with slash lines.

The object reservation server 120 further receives a displace request from the client device 140. The displace request indicates a selection object which is one of the objects in the database 110. When the selection status corresponding to the selection object is selectable, the object reservation server 120 sets the selection status corresponding to the selection object as unselectable, and sets the selection status corresponding to the connection selection object as selectable, and updates the connection selection object as the selection object, and updates the contents rendered on the reservation page.

In the embodiment, the user clicks and selects one of the connection selection objects, and then clicks and selects one object, which selection status is selectable, on the reservation page as the selection object. After performing the aforementioned operations to alter the selection statuses of the connection selection object and the selection object, the object reservation server 120 updates the selected seats shown with slash lines on the reservation page to inform the user that the operation of exchanging the connection selection object is succeed.

In another embodiment, the user clicks and selects one object, which selection status is selectable, on the reservation page, and the reservation page displays options for the user to select whether the operation to be performed is the addition request or the displace request. If the displace request is selected, then the reservation page further prompts the user to select the connection selection object on the reservation page. The process of an interface that the user operates the client device to sends the addition request or the displace request may have different variations, and it is not limited to the embodiments in the disclosure.

Figure 3:
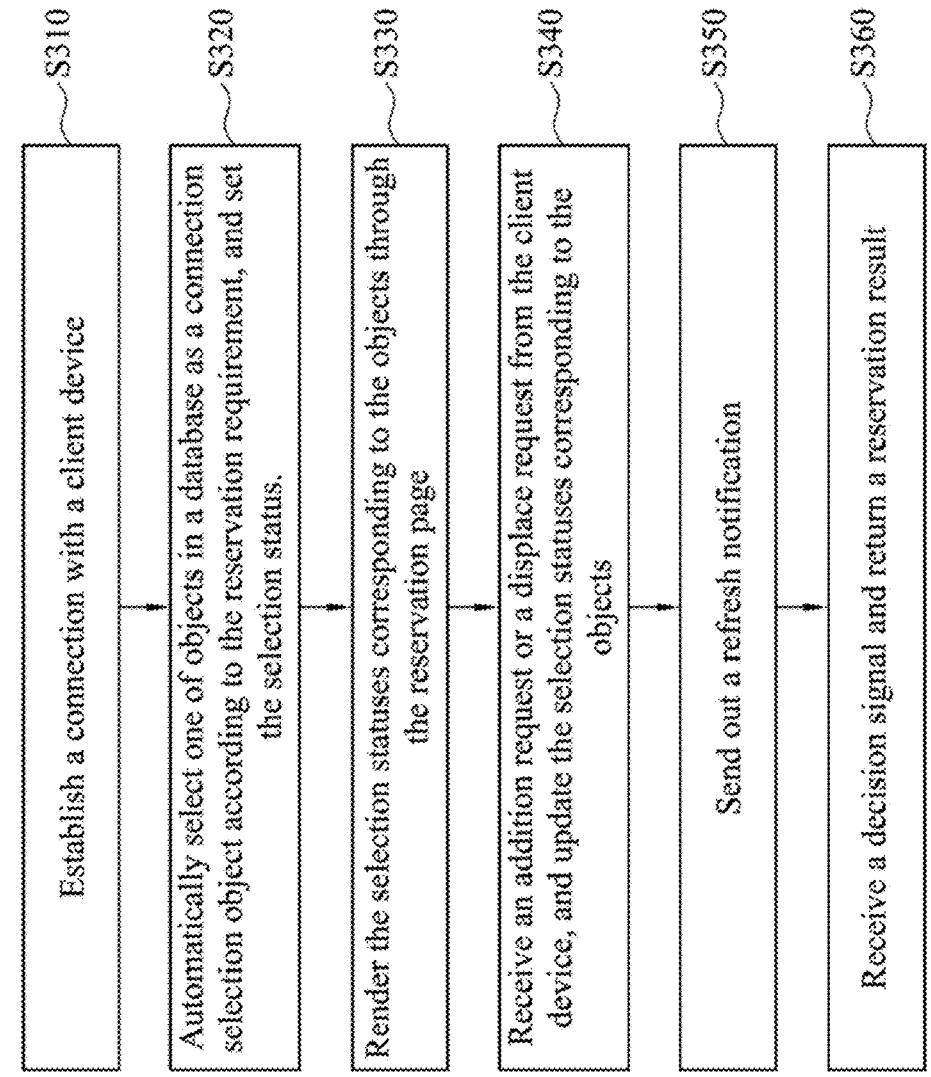
FIG. 3 is a flow chart of an online object reservation method according to a second embodiment.

FIG. 3 is a flow chart of an online object reservation method according to a second embodiment. It should be understood that a particular order of steps is used to describe the online object reservation method 300 in the flow chart, but the present invention is not limited to the order of the steps, and the number of the steps may be decreased or increased in an implementation.

The online object reservation method 300 can be implemented as a computer such as the online object reservation system 100, or some of the functions may be implemented as at least one computer program stored in a computer readable recording medium. The at least one computer program has multiple instructions. When the instructions are executed on a computer, it makes the computer perform the online object reservation method 300. In the second embodiment, for convenience and clarity, the online object reservation system 100 performing the online object reservation method 300 is taken as an example, but the disclosure is not limited thereto.

The online object reservation system 100 executes a step S310 to establish a connection with the client device 140 for communication, and provides a reservation page to the client device 140 for the user to operate the client device 140 to make the reservation. To be specific, the connection established between the object reservation server 120 and the client device 140 is a continuous connection which is also a full-duplex connection, and thus the object reservation server 120 can not only receive and respond a message transmitted by the client device 140 operated by the user, but also actively push information to the client device 140. The continuous connection is implemented by technology of WebSocket, or implemented by technology of long polling or iframe of Cornet to conform to a webpage browser with a relatively old version.

In a step S320, the object reservation server 120 receives a reservation requirement transmitted from the client device and inputted by the user. and automatically selects one of objects in a database as a connection selection object according to the reservation requirement. Because each of the objects in the database 110 is corresponding to a selection status which indicates whether the object is available to be reserved, the object reservation server 120 sets the selection status corresponding to the connection selection object as unselectable. Therefore, the connection selection object in the continuous connection established by the client device 140 operated by the user no longer accepts reservations.

In a step S330, the object reservation server 120 renders the selection statuses corresponding to the objects through the reservation page. In the embodiment, a visual feature (e.g. a symbol) is used to distinguish the selection status corresponding to the connection selection object from the selection statuses corresponding to the objects in the database 110 so that the user can identify which objects accept a reservation and a current reservation status. When the user sees the number of the objects which selection status is selectable is decreasing on the reservation page, a time period that the user needs to confirm the reservation is shortened. Color, shape, thick or thin contour using broken or solid lines may also be used for the visual feature, and it is limited to the embodiment in the disclosure.

The object reservation server also performs a step S340, receiving an addition request or a displace request from the client device 140, and updating the selection statuses corresponding to the objects. The operations that the object reservation server 120 performs for the addition request or the displace request have been described and they will not be repeated. In an embodiment, every time the client device 140 sends out an addition request or a displace request, the object reservation server 120 resets the timer 122 to prevents the continuous connection from being disconnected by the object reservation server 120 when the user is in the displacing or addition process or when the user is viewing a displacing result or an addition result.

In a step S350, the object reservation server 120 sends out a refresh notification letting the user know the latest reservation status. To be specific, the object reservation server 120 establishes the additional continuous connections with an additional client devices 130, and the additional client device 130 alters the selection statuses corresponding to the objects in the database 110 through the additional connection. When the selection status corresponding to any one of the objects is altered, the object reservation server 120 sends the refresh notification to the client device 140 and updates the contents rendered on the reservation page of the client device 140.

The object reservation server 120 executes a step S360 to receive a decision signal. When the decision signal indicates OK to reserve, the object reservation server 120 return a successful reservation result to the client device 140. When the decision signal indicate canceling the reservation, the object reservation server 120 can return a message for confirmation and a message about the current condition of the reservation. For example, a message of "80% of the "600 dollars tickets" you are considering have been booked" may be returned for concluding an overall condition of the reservation and assisting the user with deciding whether to cancel the reservation.

Figure 4:
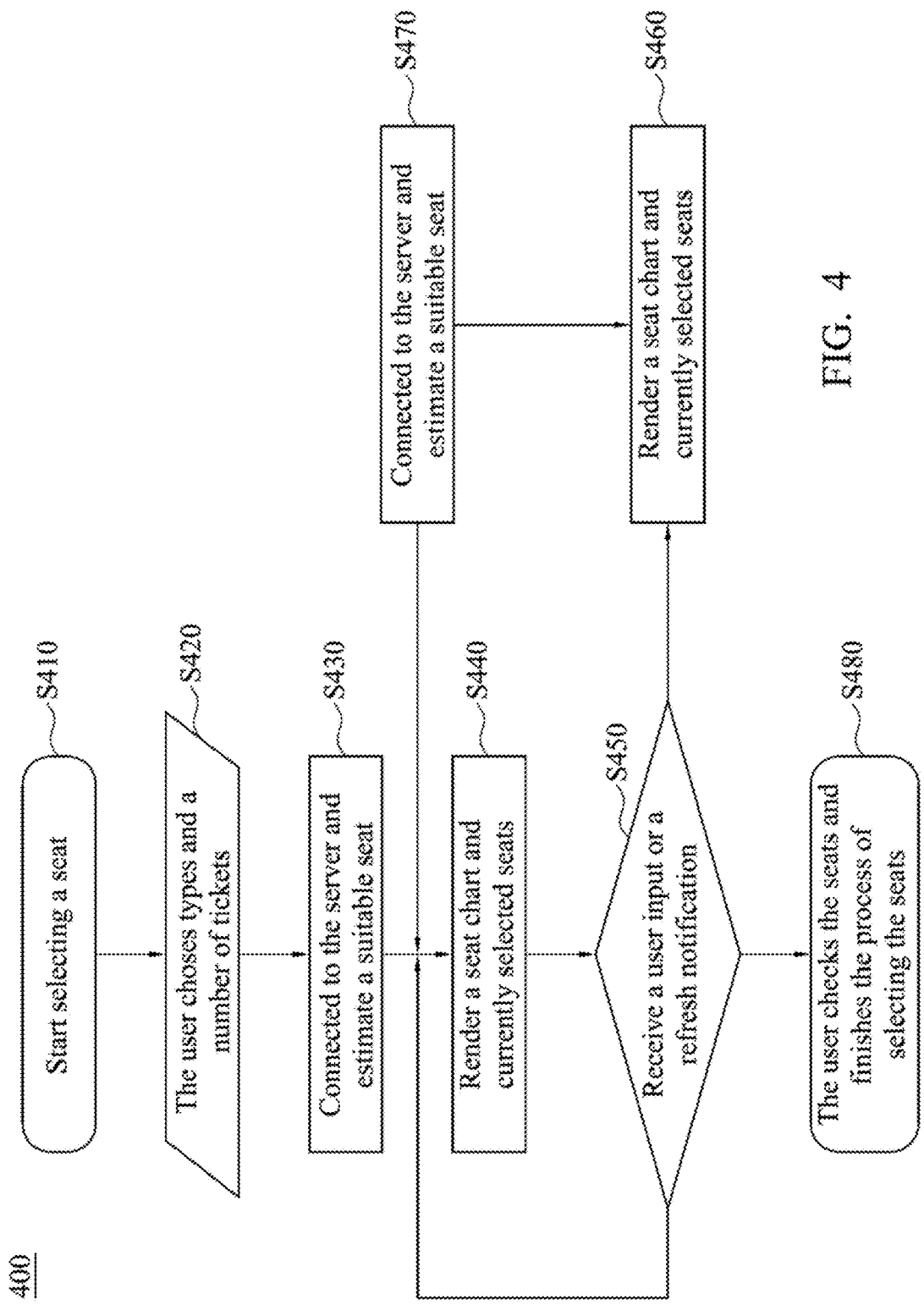
FIG. 4 is a user flow chart of the online object reservation method according to a third embodiment.

FIG. 4 is a user flow chart of the online object reservation method according to a third embodiment to describe the online object reservation method 400 from an aspect of a user interface. For convenience and clarity, the online object reservation system 100 shown in FIG. 1 is taken as an example for the description of the online object reservation method 400, but the disclosure is not limited thereto.

In a step S410 the user operates the client device 140 to connect to the object reservation server 120 and to start selecting a seat, and uses a display of the client device 140 to browse a reservation page. The reservation page renders a seat map and a reservation status of a performance field and let the user to input. In an embodiment, the client device 140 used by the user is a personal computer, and a browser is installed in the personal computer to browse the reservation page. The browser may be Internet Explorer, Chrome, Firefox, etc. In another embodiment, the client device 140 used by the user is a mobile device, and the user browse the reservation page provided by the object reservation server 120 by a mobile application.

In a step S420, the user chooses types and a number of tickets. The type of the tickets includes a price and a field area. The type and the number of the tickets chosen by the user are reservation requirements. In a step S430, the object reservation server 120 estimates a suitable seat. The suitable seat may be a seat closest to a performance stage or a seat closest to a front of the performance stage. In another embodiment, the object reservation server 120 lists automatically-selected criteria so that the user can check according to his preference.

In a step S440, The client device 140 renders a seat chart and currently selected seats. In addition to mark the currently selected seats (i.e. the connection selection objects) by a visual feature, the reservation page also distinguishes the seats which selection statuses are selectable from the seats which selection statuses are unselectable. In a step S450, a user input or a refresh notification transmitted from the object reservation server 120 is received. When the refresh notification is received, the step S440 is performed again and the displayed seat chart is updated so that the user knows a real-time reservation status. If the user inputs an addition request or a displace request, a step S460 is performed.

The object reservation server 120 performs a step S460 to estimate if a seat is selectable, that is to say, to determine the selection status corresponding to the added object of the addition request or the selection object of the displace request, and performs the operation of displaying a corresponding processed message in a step S470. When the corresponding selection status is selectable, the user is informed that the addition request or the displace request is succeed, or otherwise a fail message is displayed. The user can repeatedly transmits the addition request or the displace request until he is satisfied with the currently selected seat (i.e. connection selection object) or until the timer 122 ends the countdown, and a step S480 is performed to check the seats and finish the process of selecting the seats.

In the online object reservation system and the method of the disclosure, after the user successfully logs in and obtains a connection selection object, the additional connections are restricted from reserving the connection selection object of the user to prevent the object from being reserved by someone else after the user confirms the reservation. As a result, the process of the reservation is smoothened over, and the inconvenience that the user has to start over the selection is reduced. On the other hand, the real-time information of the selection status is rendered on the reservation page so that the user may understand the popularity of the object to be reserved to assist the user with making the reservation decision. Last, providing the user with the real-time reservation information uses a Bandwagon effect causing the user make the reservation decision quickly that has advantages for the provider of the seats and the time sections. Therefore, the online object reservation system and the method can create a win-win situation for both the users and the provider.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An online object reservation system, comprising:
   a database, storing a plurality of objects, wherein each of the objects is corresponding to a selection status; and
   an object reservation server, connected to the database and establishing a continuous connection with a client device for providing a reservation page to the client device and receiving at least one reservation requirement from the client device,
   wherein the object reservation server automatically selects at least one of the objects as a connection selection object according to the reservation requirement, and renders the objects through the reservation page, wherein the connection selection object is exclusively kept for the client device until the continuous connection with the client device is disconnected, the reservation page distinguishes the selection status corresponding to the connection selection object from the selection statuses corresponding to the objects by at least one visual feature,
  wherein the object reservation server also establishes one or a plurality of additional continuous connections with one or a plurality of additional client devices, and when the selection status corresponding to any one of the objects is altered by the additional client devices, the object reservation server sends a refresh notification to the client device through the continuous connection for updating contents rendered on the reservation page,
  wherein the object reservation server comprises a timer, wherein the object reservation server activates the timer when the continuous connection is established,
  wherein when an accumulated time value of the timer is greater than a predetermined value, the client device disconnects the continuous connection, and sets the selection status corresponding to the connection selection object as selectable,
  wherein the predetermined value is decreased when a ratio of a number of connected client devices to all available objects is greater than a threshold.

2. The online object reservation system of claim 1, wherein the object reservation server receives an addition request from the client device for adding an added object into the connection selection object, wherein the added object is one of the objects,
  wherein when the selection status corresponding to the added object is selectable, the object reservation server sets the selection status corresponding to the added object as unselectable, and adds the added object into the connection selection object, and updates the contents rendered on the reservation page.

3. The online object reservation system of claim 1, the object reservation server receives a displace request from the client device, wherein the displace request indicates a selection object, and the selection object is one of the objects,
  wherein when the selection status corresponding to the selection object is selectable, the object reservation server sets the selection status corresponding to the selection object as unselectable, sets the selection status corresponding to the connection selection object as selectable, updates the connection selection object, and updates the contents rendered on the reservation page.

4. The online object reservation system of claim 1, wherein the objects are a plurality of seats, and the reservation requirement comprises a ticket price and a field area.

5. The online object reservation system of claim 1, wherein the object reservation server renders, through the reservation page, updating statistics of the selection status corresponding to the objects after the continuous connection is established.

6. The online object reservation system of claim 1, wherein the object reservation server renders statuses of the additional continuous connections through the reservation page.

7. An online object reservation method, comprising following steps:
  establishing a continuous connection to communicate with a client device, and providing a reservation page to the client device;
  receiving at least one reservation requirement transmitted from the client device, automatically selecting one of a plurality of objects in a database as a connection selection object according to the reservation requirement, wherein the connection selection object is exclusively kept for the client device until the continuous connection with the client device is disconnected, each of the objects is corresponding to a selection status, and setting the selection status corresponding to the connection selection object as unselectable;
  rendering the objects through the reservation page, and distinguishing the selection status corresponding to the connection selection object from the selection statuses corresponding to the objects by at least one visual feature;
  establishing one or a plurality of additional continuous connections to communicate with one or a plurality of additional client devices, wherein when the selection status corresponding to any one of the objects is altered by the additional client devices, an object reservation server transmits a refresh notification, and updates contents rendered on the reservation page;
  activating a timer when the continuous connection is established;
  when an accumulated time value of the timer is greater than a predetermined value, disconnecting the continuous connection, and setting the selection status corresponding to the connection selection object as selectable; and
  decreasing the predetermined value when a ratio of a number of connected client devices to all available objects is greater than a threshold.

8. The online object reservation method of claim 7, further comprising:
  receiving an addition request from the client device for adding an added object into the connection selection object, wherein the added object is one of the objects; and
  when the selection status corresponding to the added object is selectable, setting the selection status corresponding to the added object as unselectable, and adding the added object into the connection selection object, and updating the contents rendered on the reservation page.

9. The online object reservation method of claim 7, further comprising:
  receiving a displace request from the client device, wherein the displace request indicates a selection object, and the selection object is one of the objects; and
  when the selection status corresponding to the selection object is selectable, setting the selection status corresponding to the selection object as unselectable, and setting the selection status corresponding to the connection selection object as selectable, and updating the contents rendered on the reservation page.

10. The online object reservation method of claim 7, wherein the objects are a plurality of seats, and the reservation requirement comprises a ticket price and a field area.

11. The online object reservation method of claim 7, further comprising:
  rendering, through the reservation page, updating statistics of the selection status corresponding to the objects after the continuous connection is established.

12. The online object reservation method of claim 7, further comprising:

rendering statuses of the additional connections through the reservation page.

\* \* \* \* \*